Figure 1:
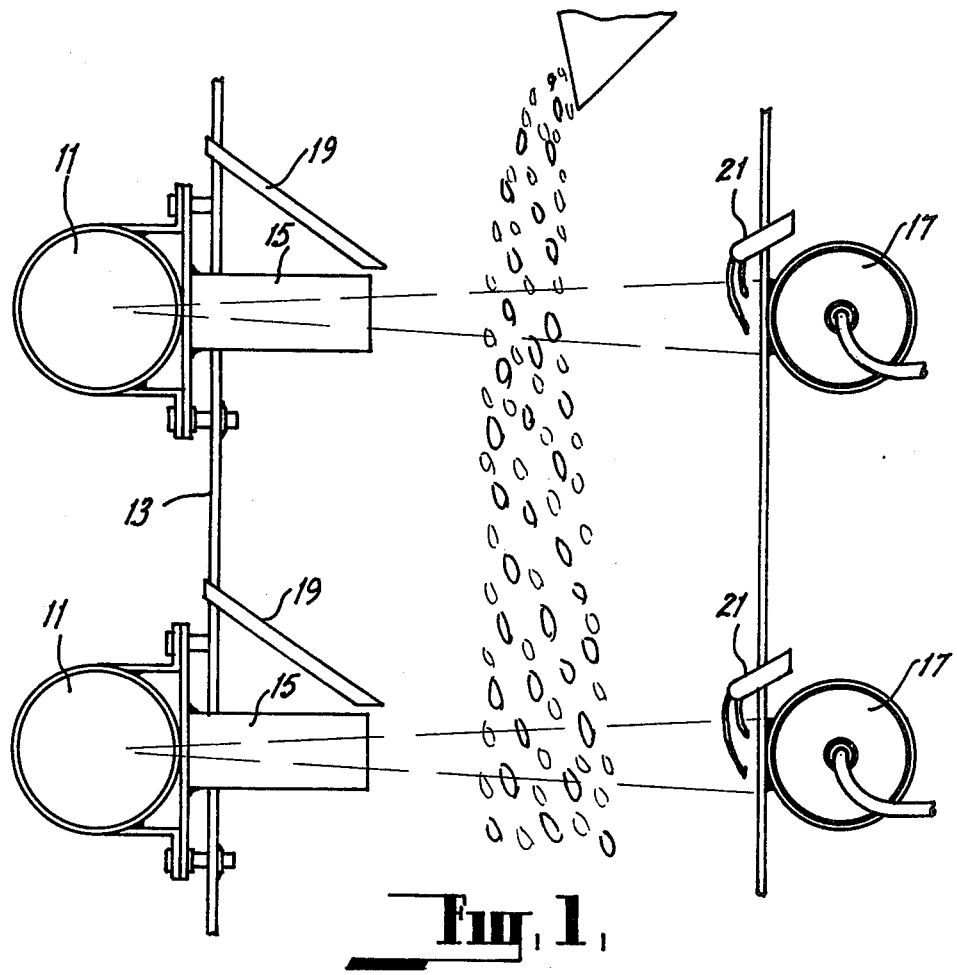

United States Patent [19]

Stubbs

[11] 4,205,230
[45] May 27, 1980

[54] SOLID MATERIALS FLOW RATE MEASUREMENT

[75] Inventor: Raymond F. Stubbs, Osborne Park, Australia

[73] Assignee: Pretron Electronics Pty. Ltd., Osborne Park, Australia

[21] Appl. No.: 828,674

[22] Filed: Aug. 29, 1977

[51] Int. Cl.² .............................................. G01F 1/00
[52] U.S. Cl. ................................................... 250/356
[58] Field of Search ................... 250/356, 358 R, 359, 250/360, 308, 272, 273

[56] References Cited

U.S. PATENT DOCUMENTS

| | | | |
|---|---|---|---|
| 2,953,681 | 9/1960 | Frazier | 250/356 |
| 3,662,174 | 5/1972 | McMullen et al. | 250/360 X |

*Primary Examiner*—Davis L. Willis
*Attorney, Agent, or Firm*—Ernest A. Beutler

[57] ABSTRACT

A flow gauge for measuring the mass flow rate of freely flowing material, falling through a path, said flow gauge comprising a pair of sensors spaced longitudinally along the chute, the sensors being connected to a computing means for receiving the output of each sensor, where said output is a measure of the density of the flow at the location of the sensor, the computing means utilizing the output of the sensors to provide a measure of the mass flow rate, said sensors comprising a radiation source and a radiation detector in opposed relation to the source and on the other side of the flowing material from the detector, for detecting the radiation passing through the flowing material.

23 Claims, 2 Drawing Figures

SOLID MATERIALS FLOW RATE MEASUREMENT

This invention relates to the measurement of flow rate of materials.

In the processing, or handling or loading of particulate materials such as ores and grains, it is usually necessary at some stage to measure the flow rate of material. Existing methods of carrying out this function involves the use of some type of gauge or weighing device placed over or otherwise used in conjunction with moving belts on which the material is being conveyed. There are several factors which limit the accuracy of these devices and they cannot be used where there is no conveyor belt or where the working area is very confined.

It is an object of this invention to measure the flow rate of particulate material flowing under the influence of gravity from a chute feeder or like outlet.

The term particulate material may refer to material composed of homogenous material of substantially uniform particle size and/or density or it may refer to heterogeneous material of differing particle size and/or density, or any combination of such parameters. In addition the material may be fluidised or in a slurry form.

In one form the invention resides in a flow gauge for measuring the mass flow rate of freely flowing material, falling through a path, said flow gauge comprising a pair of sensors spaced longitudinally along the chute, the sensors being connected to a computing means for receiving the output of each sensor, where said output is a measure of the density of the flow at the location of the sensor, the computing means utilising the output of the sensors to provide a measure of the mass flow rate, said sensors comprising a radiation source and a radiation detector in opposed relation to the source and on the other side of the flowing material from the detector, for detecting the radiation passing through the flow material.

In another form the invention resides in a flow gauge for measuring the mass flow rate of particulate material falling freely through a chute, said flow gauge comprising a pair of sensors spaced longitudinally along the chute and being connected to a computing means, said sensors comprising a radiation source and a radiation detector mounted to the chute in opposed relation on either side of the flow of particulate material, said sensing means providing an output during a no flow and a flow state in the chute and the computing means determines from the output of each sensor under flow and no flow conditions a measure of density at the location of the sensor, said measure of density being determined by $$d = \frac{\log \frac{N}{N_o}}{a}$$

("d" represents the area density of flow, "N" and "No" represents the sensor output under flow and no flow states and "a" represents the area of the cross sectional area of falling material) and wherein the measure of density at each sensor location is utilised to determine the velocity of the flow at one or the other sensor by $$V = \sqrt{\frac{2gs}{\frac{d_1^2}{d_2^2} - 1}}$$

(g represents the gravitational accelleration constant, s represents the spacing between the sensors, and $d_1$ and $d_2$ represents the measure of density obtained from the two sensors respectively) and the velocity is utilised to determine the mass flow rate by $$R = V \times d \times W$$

("d" represents the area density at the sensor location at which the velocity has been calculated, and W represents the width of the flowing material).

Figure 2:
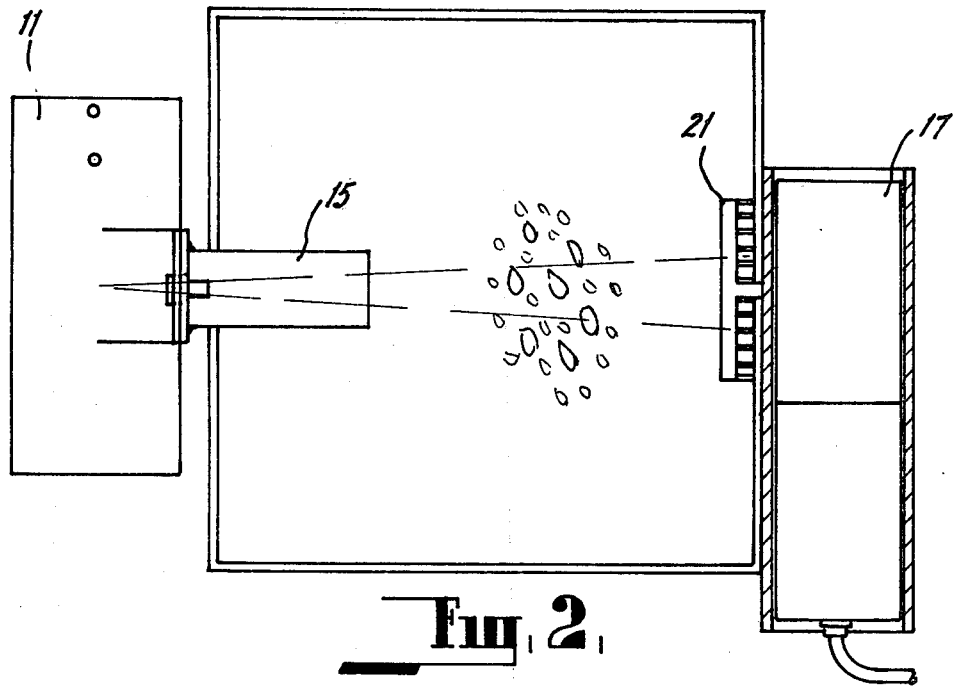

The invention will be more fully understood in the light of the following description of one specific embodiment. The description is made with reference to the accompanying drawings of which:

FIG. 1 is a sectional elevation of a flow path of of ore showing the source and detectors of the embodiment; and FIG. 2 is a sectional plan of the flow path of FIG. 1 along line A—A.

The embodiment as shown in the drawings comprises two gamma radiation sources 11 of $Cs^{137}$ which are fixed to the side wall of the chute 13. Suitable radiation shielding is provided around the source 11 other than the opening which is directed in line with the diametric axis of the chute and is provided with a shutter (not shown) to selectively permit the escape of the radiation. Suitable collimation means 15 is associated with the aperture such as to reduce any scatter radiation from the source such that any radiation emitted therefrom is substantially in line with the diametric axis of the chute. The detectors 17 are disposed on the diametrically opposed side of the chute 13 from the source 11 such as to receive the peak radiation from the opposed source 11 and each detector is set to detect the characteristic energy radiation of the $Cs^{137}$ source (i.e. 0.662MeV). The emission face of each collimator 15 is associated with an air outlet 19 which is in communication with a source of compressed air. The outlet is located such as to prevent material flowing past the emission face of the collimator from coming in contact with the face and adhering thereto. Similar compressed air outlets 21 are associated with each detector to maintain the collection face of each detector substantially clear of deposits.

In locating the sources and detectors to the chute it is necessary that the spacing between the upper and lower set be precise. It is also necessary that the orientation of each source and its associated detector be precise in order that the detector be located to receive the maximum intensity of the radiation beam.

The gamma radiation beam passing through the curtain of ore passing through the chute is attenuated by the ore. The ratio between the transmission of the gamma radiation through the chute with and without the ore flowing gives a transmission factor $$T = \frac{N}{N_o}$$

(N and No represent the count at the detector when ore is flowing and when ore is not flowing respectively for identical count periods). The area density of the ore curtain flowing through the chute can be calculated from the transmission factor by $$d = \frac{\log T}{a}$$

(a is the mass absorbtion coefficient of the ore)

Knowing the area density of the ore curtain and the width of the curtain the velocity of the ore flow must be determined in order to calculate the actual ore flow through the chute.

In order to determine the velocity the two sets of nuclear sources and detectors described above are used to determine the area density of the ore curtain at their respective locations through the transmission factor T. On its passage through the chute the ore is accelerated and thus the velocity of the ore between the nuclear source and detector set is increased and while the mass flow past each source detector set is the same, the ore densities measured are different. Thus from the basic law of linear motion $$V_2^2 = V_1^2 + 2gs$$

(g is the gravitational acceleration) it may be established that the velocity at the upper source and detector set can be calculated from $$V = \sqrt{\frac{2gs}{\frac{d_1^2}{d_2^2} - 1}}$$

(s is the vertical spacing between the upper and the lower source and detector set). The mass flow rate can then be calculated as $$R = d_1 V_1 W$$

(W is the curtain width)

As well as providing the instantaneous flow rate the gauge also can incorporate a counter which can accumulate the total tonnage which passes the source detector sets during a given period.

In practice there will be a slight variation in the value of No because of diurnal and seasonal temperature variations which will cause the detector to drift slightly. There will also be a slight reduction in the value of No due to gradual decay of the radioactive source. These variations are allowed for by taking measurements of No at every shut down of the ore supply through the chute so that any trends which are present in the drifting of the zero count rate can be detected and the trend can be projected into the next run to ensure that the most accurate value possible is used for No. Provision may be made to cause a temporary shutdown during a run in the event of the current value of No being sensed to be unreliable in order to facilitate the determination of a reliable value of No.

The nuclear source and detector sets are associated with a programmed computor which receives the count from the detectors and carries out the required calculation. The gauge incorporates a flow sensor to detect a flow of ore through the chute together with sensors to determine whether the shutters of the sources are closed or open.

The programme of the computor of the gauge is such that during a period of there being no flow of ore the sensors provide a periodical No count which is used to update and maintain a current value of the zero transmission factor of the chute when no ore is flowing through the chute. In the event of the ore flowing through the chute a start up signal from a suitable sensor initiates the programme into its calculation mode. The count N which is obtained with the ore flowing through the chute is initially submitted to a series of tests to determine whether or not the value received for N is realistic or not.

The tests on N basically comprise comparing the value obtained with the value of No to determine whether the value of N is larger or smaller than predetermined limits in which the anticipated value of N can be expected to fall. A count in excess of the upper limit would be an indication that the ore is in fact not flowing and that the initial start up signal was a false alarm. In such an event the programme would return to the No counting mode and await a fresh start up signal as well as providing a visual signal at the flow gauge read out of the false alarm. In the event of the value for N falling below an anticipated value such would be an indication that in fact the shutters of the sources are closed. In such an event the programme may initiate the necessary action to open the shutters and/or indicate at the gauge readout that a fault exists at the shutters.

A further test may be applied to the incoming value of N to determine any drift in the value of N which may indicate some drifting of the detector due to temperature variations or like effects. If such drifting is detected as being possible, the programme initiates a shut down of the ore flow in order that the value of No may be rechecked and once a value has been established may reinitiate the ore flow. Alternatively the programme may only indicate that the value of No has possibly become unreliable without causing a shutdown of the ore flow.

It has also been found desirable to subject the value of N and No to a filter in order to overcome the error resulting from the periodic fluctuation of the value of N and No due to the utilisation of a radioactive source. The filters are of an automatically programmable form which comprises mathematical equivalents of conventional electronic filters but having the specific advantages that their parameters adjust to follow the rate of flow of ore, thereby maximising the accuracy of flow measurement and the accuracy of total tonnage measurement.

It should be appreciated that while the embodiment has been described in relation to one particular source of gamma radiation the invention need not be restricted to that source or indeed to the use of gamma radiation. The radiation of the sensors may comprise, any suitable form of electro-magnetic radiation, radioactive source radiation such as alpha or beta radiation or X-radiation, or ultrasonic radiation.

I claim:

1. The method of measuring the mass flow rate of a freely flowing material flowing under the force of gravity through a path comprising the steps of measuring the density of flow at a first sensing location, measuring the mass density of flow at a second sensing location spaced a predetermined vertical distance below said first sensing location and computing the mass flow rate of the material from the measurements thus obtained.

2. The method as set forth in claim 1 wherein the measurement of density at each point is made by a radiation source and a radiation detector in opposed relation to the source and on the other side of the flowing material from the detector for detecting the radiation passing through the flowing material.

3. The method as claimed at claim 2 including the step of determining a transmission factor by taking a ratio of the measure of the output of the detection obtained during no flow and a measure obtained during flow to obtain a density measure of the material flow at each sensing location.

4. The method as claimed at claim 3 wherein the density measure is derived from the equation $$d = \frac{\log T}{a}$$

where "d" represents the area density of the flow, "T" represents the transmission factor, and "a" represents the area of the chute.

5. The method as claimed at claim 4 wherein the density measure is utilised to derive a measure of the velocity at the sensing location and where the measure of the mass flow rate is determined by the following equation $R = V \times d \times W$ where R represents the mass flow rate, V represents the velocity of the flow rate at one sensing location, d represents the area density of the flow, and W represents the width of the flowing material.

6. A flow gauge as claimed at claim 5 wherein the velocity measure of the material flow at the highest sensing location encountered by the material flow is dervied from the equation $$V = \sqrt{\frac{2gs}{\frac{d_1^2}{d_2^2} - 1}}$$

where "g" represents the constant gravitational acceleration applied to the flow, s represents the distance between the sensing locations, and $d_1$ and $d_2$ represents the measure of area density obtained at the respective sensing location.

7. A method as claimed at claim 2 wherein the measurement indication of material flow is submitted to a series of tests to verify the reliability.

8. A method as claimed at claim 7 wherein said verification tests comprise ensuring the measure falls within predetermined upper and lower limits to verify that there is in fact material flow and the radiation source is operative.

9. A method as claimed at claim 7 wherein said verification tests comprise testing the measure for any consistent variation over a period of time to verify the reliability of the measure obtained during no material flow.

10. A method as claimed at claim 9 including the step of periodically interrupting the material flow to obtain a fresh measurement during no material flow, in the event of the previous measurements for no material flow being determined as unreliable.

11. A method as claimed at claim 9 including the step of periodically interrupting the material flow to obtain a fresh measurement during no material flow, in the event of the previous measurements for no material flow being determined as unreliable.

12. A method as claimed at claim 7 wherein said verification tests comprise ensuring the measure falls within predetermined upper and lower limits to verify that there is in fact material flow and the radiation source is operative.

13. A method as claimed at claim 7 wherein said verification tests comprise testing the measure for any consistent variation over a period of time to verify the reliability of the measure obtained during no material flow.

14. A method as claimed at claim 2 wherein the measure of the output sensors is subjected to a mathematical equivalent to a conventional electronic filter to account for the existence of noise in the output, but where the parameters adjust according to the rate of flow of the ore.

15. A method as claimed at claim 2 wherein said radiation source is a radioactive isotope.

16. A method as claimed at claim 15 further including the step of collimating the emissions from the source to a direction substantially towards the detector, and using a shutter to control the emission of radiation from the source through the collimator.

17. A method as claimed at claim 15 further including the step of collimating the emissions from the source to a direction substantially towards the detector, and using a shutter to control the emission of radiation from the source through the collimator.

18. A method as claimed at claim 2 further including the step of directing a pressurised fluid across to inhibit the collection of material on the detection face.

19. A method as claimed at claim 2 wherein the measurement indications of material flow is submitted to a series of tests to verify the reliability.

20. A method for measuring the mass flow rate of particulate material falling freely through a chute comprising the steps of measuring the density of flow at each of two locations spaced longitudinally along the chute by means of a radiation source and a radiation detector mounted to the chute in opposed relation on either side of the flow of particulate material, measuring the density during a no flow and a flow state in the chute and for deriving a measure of density at the location of the sensor, said measure of density being determined by $$d = \frac{\log \frac{N}{No}}{a}$$

("d" represents the area density of flow, "n" and "no" represents the measurement under flow and no flow states and "a" represents the area of the chute) and using the measure of density at each location to determine the velocity of the flow at one or the other location by $$V = \sqrt{\frac{2gs}{\frac{d_1^2}{d_2^2} - 1}}$$

(g represents the gravitational acceleration constant, s represents the spacing between the location, and $d_1$ and $d_2$ represents the measure of density obtained at the two locations respectively) and the velocity is utilised to determine the mass flow rate by $R = V \times d \times W$ ("d"

represents the area density at the location at which the velocity has been calculated, and W represents the width of the flowing material).

21. A method as set forth in claim 20 wherein the measure of the output sensors is subjected to a mathematical equivalent to a conventional electronic filter to account for the existence of noise in the output, but where the parameters adjust according to the rate of flow of the ore.

22. A method as set forth in claim 20 wherein said radiation source is a radioactive isotope.

23. A method as claimed at claim 20 further including the step of directing a pressurized fluid across to inhibit the collection of material on the detection face.

* * * * *

UNITED STATES PATENT AND TRADEMARK OFFICE
CERTIFICATE OF CORRECTION

PATENT NO. : 4,205,230
DATED : May 27, 1980
INVENTOR(S) : Raymond F. Stubbs

It is certified that error appears in the above—identified patent and that said Letters Patent are hereby corrected as shown below:

column 1, line 27, "fluidised" should be ---fluidizing---; column 1, line 36, "utilising" should be ---utilizing---; column 1, line 67, "utilised" should be ---utilizing---; column 2, line 11, "utilised" should be ---utilized---; column 4, line 44, "utilisation" should be ---utilization---; column 4, line 49, "maximising" should be ---maximizing---; column 5, line 23, "utilised" should be ---utilized---; column 6, line 24, cancel claim 17; column 6, line 30, "pressurised" should be ---pressurized---; column 6, line 51, "n" should be ---N---; column 6, line 51, "no" should be ---No---; column 6, line 67, "utilised" should be ---utilized---.

Signed and Sealed this

Sixteenth Day of December 1980

[SEAL]

Attest:

SIDNEY A. DIAMOND

Attesting Officer

Commissioner of Patents and Trademarks